United States Patent

Wasada

[11] Patent Number: 5,100,254
[45] Date of Patent: Mar. 31, 1992

[54] PROTECTOR FOR BALL JOINT
[75] Inventor: Tsuneharu Wasada, Aichi, Japan
[73] Assignee: TRW Steering & Industrial Products Co., Ltd., Tokyo, Japan
[21] Appl. No.: 690,534
[22] Filed: Apr. 23, 1991
[30] Foreign Application Priority Data
Apr. 26, 1990 [JP] Japan .................. 2-111648
[51] Int. Cl.⁵ .............................. F16C 11/00
[52] U.S. Cl. ................ 403/134; 403/122; 277/212 FB
[58] Field of Search ............ 403/134, 122; 277/212 FB

[56] References Cited
U.S. PATENT DOCUMENTS
4,220,418  9/1980  Kondo et al. ............ 277/212 FB X
FOREIGN PATENT DOCUMENTS
892025  3/1962  United Kingdom ............ 403/134

Primary Examiner—Andrew V. Kundrat
Attorney, Agent, or Firm—Tarolli, Sundheim & Covell

[57] ABSTRACT

A protector for a ball joint comprising a body for protecting a dust cover mounted on the ball joint and means for securely mounting the body on the dust cover.

3 Claims, 3 Drawing Sheets

PROTECTOR FOR BALL JOINT

BACKGROUND OF THE INVENTION

1. Field of the Invention

This invention relates to a protector for a ball joint, more particularly, to an improvement in a protector which protects a dust cover attached to a ball joint which rotatably and swingably connects two members together.

2. Description of the Prior Art

Generally, a protector for a ball joint in which a dust cover is attached to a ball joint which rotatably and swingably connects two members together and the protector protects the dust cover from flying stones, etc. is known by those skilled in the art.

Typical arrangements of known protectors are shown in FIGS. 8 and 9. In FIG. 8, a protector 1 is interposed between a dust cover 3 and a knuckle arm 4 to cover the dust cover attached to a ball joint 2. The ball joint 2 has a socket 5, a bearing 6 inserted into the socket and a ball stud 7 supported in the bearing. The ball stud has a ball portion 7a rotatably and swingably inserted into the bearing and a stud 7b extending from the ball portion. The dust cover 3 is fixed to the socket 5. The stud 7b of the ball stud 7 is fixed to the knuckle arm 4 passing through a central hole 1a of the protector 1 and a central hole 3a of the dust cover 3.

In FIG. 9, a protector 1' is integrally formed on the dust cover 3. The arrangement shown in FIG. 9 is similar to that shown in FIG. 8 except that the protector is integrally formed on the dust cover. In FIG. 9, the same parts as in FIG. 8 are indicated by the same reference numerals as in FIG. 8.

As typical examples of the arrangement of the protector shown in FIG. 8, there are Japanese Utility Model Public Disclosure (KOKAI) Nos. 57-186716, 57-194919, 57-194920 and 58-60022.

As typical example of the arrangement of the protector shown in FIG. 9, there is Japanese Utility Model Public Disclosure (KOKAI) No. 57-203167.

However, the above prior art has some problems as follows.

In the protector shown in FIG. 8, there are the disadvantages that (i) a gap tends to produce between the knuckle arm 4 and the dust cover 3 and therefore seal of a contacting surface of the dust cover with the knuckle arm is not sufficient, (ii) a worker forgets to assemble the protector may, by oversight, not be provided on the ball joint during assembly since the protector is separated from the dust cover, and (iii) wear occurs on a contacting surface of the protector with the knuckle arm.

In the protector shown in FIG. 9, there are the disadvantages that (i) the formation of the dust cover is difficult since the protector is integral with the dust cover, (ii) wear occurs a contacting surface of the protector (or dust cover) with the knuckle arm, and (iii) the protector together with the dust cover must be exchanged in the event of exchange of the protector.

SUMMARY OF THE INVENTION

It is an object of the present invention to provide a protector for a ball joint which can overcome the above disadvantages in the prior arts.

It is another object of the present invention to provide a protector for a ball joint wherein clearance does not occur between a knuckle arm and a dust cover.

It is another object of the present invention to provide a protector for a ball joint which may be easily produced and assembled.

It is another object of the present invention to provide a protector for a ball joint wherein exchange of the protector can easily be carried out.

To accomplish these objects, in a preferred embodiment of the present invention, a protector is separated from a dust cover and the protector is mounted on the dust cover.

The protector is mounted on the dust cover by means of a mounting means.

The protector protects the dust cover from flying stones etc.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 8:
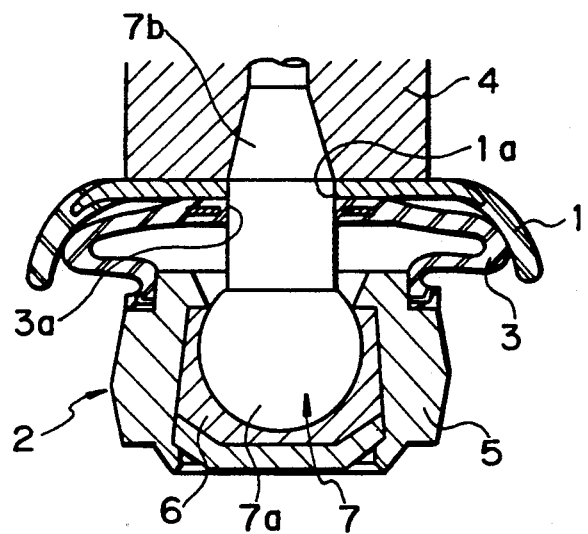
FIGS. 8 and 9 are sectional views showing arrangements of a protector and a ball joint in prior art.
Figure 9:
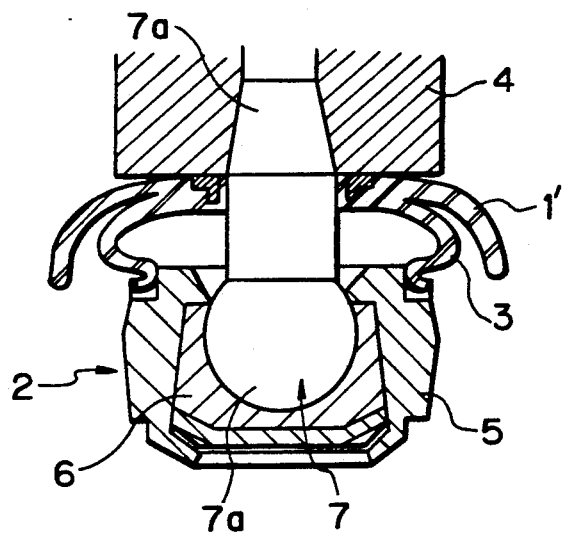

Referring now to FIGS. 1 to 7, a protector for a ball joint according to the present invention is designated at numeral 10. In FIGS. 1 to 7, the same parts as in FIGS. 8 and 9 are indicated by the same reference numerals as in FIGS. 8 and 9.

It should be noted that in the present invention the protector is separately formed from a dust cover 3 and is mounted on the dust cover 3.

Figure 3:
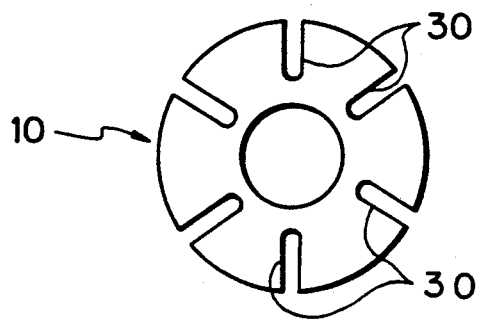
FIG. 3 is a plan view showing one embodiment of the protector.

The protector 10 includes a body which has an annular configuration as viewed in plane, as shown in FIG. 3 and which has a transverse sectional plane in cup shape to cover the dust cover so that the dust cover 3 can be protected from flying stones, etc. (see FIG. 1).

The body of the protector 10 has a central flat base portion 10a and a curved flange portion 10b extending from the periphery of the base portion 10a.

The body is made from a resin or rubber material having a suitable elasticity. Such an elastic body is not permanently deformed by flying stones.

The body of the protector is secured to the dust cover 3 by means of a mounting means 11.

In this case, a central outer surface of the dust cover 3 is provided with a lip portion 12 extending toward a knuckle arm 4.

Figure 1:
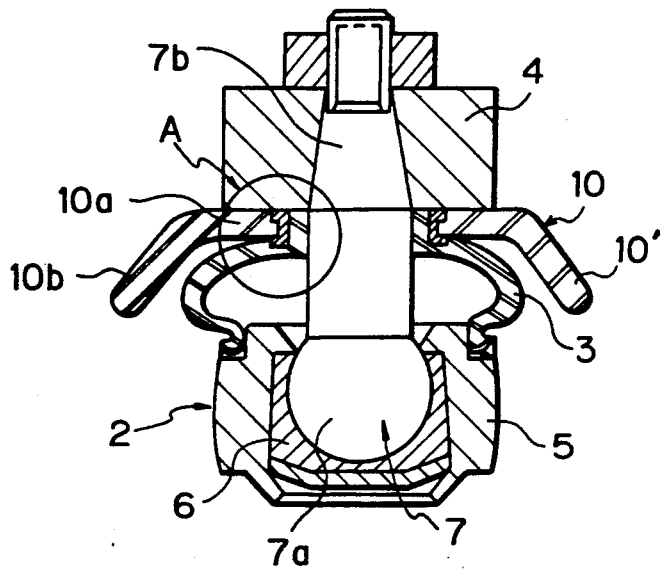
FIG. 1 is a sectional view of a connecting portion between a knuckle arm and a ball joint having a protector according to the present invention.
Figure 2:
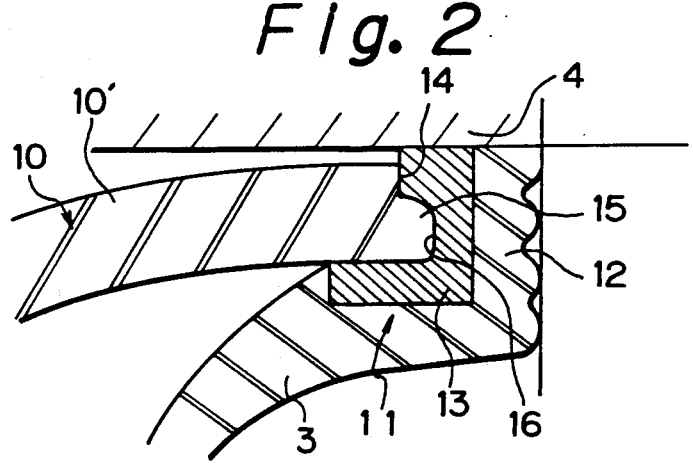
FIG. 2 is an enlarged sectional view of the portion A in FIG. 1.

A first embodiment of the mounting means 11 is illustrated in FIGS. 1 and 2. The mounting means comprises a first ring 13 attached to the outer periphery of the lip portion 12 of the dust cover 3, a hole 14 provided in a central portion of the base portion 10a, a projection 15 extending inwardly from an inner wall of the hole 14 and a groove 16 provided in the first ring 13. The first ring 13 passes through the hole 14 and the projection 15 is inserted into the groove 16 (see FIG. 2).

In this embodiment, the body 10' is mounted on the first ring 13 by inserting the first ring 13 into the hole 14 and is fixed to the dust cover 3 by press-fitting the projection 15 into the groove 16.

Figure 4:
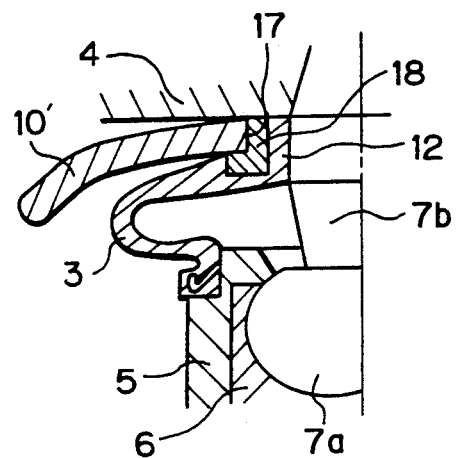
FIGS. 4, 5, 6 and 7 are partial sectional views showing other embodiments of a mounting means for mounting the protector on a dust cover.

The second embodiment of the mounting means 11 is illustrated in FIG. 4. In this embodiment, the mounting means comprises a hole 17 provided in the central portion of the base portion 10a and a second ring 18 inserted into the hole 17. The second ring 18 is fixed to the periphery of the lip portion 12. In this embodiment, the body of the protector is fixed to the dust cover by press-fitting the second ring into the hole 17 of the body 10'.

Figure 5:
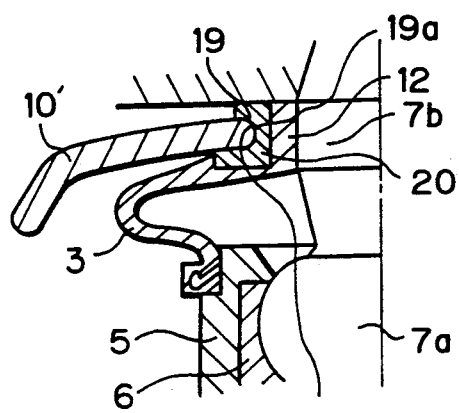

FIG. 5 illustrates a third embodiment of the mounting means 11. In this embodiment, the mounting means comprises a hole 19 provided in the central portion of the protector and a third ring 20 inserted into the hole 19. An inner edge 19a of the hole 19 has a semi-circular configuration. The third ring 20 is secured to the lip portion 12 of the dust cover. The outer periphery of the third ring 20 is provided with a groove 21 in which the semi-circular inner edge 19a is inserted.

In the embodiment, the third ring 20 is inserted into the hole 19 of the body 10' of protector 10. The inner edge 19a of the hole 19 is then press-fitted into the groove 21 of the third ring so that the body 10' is fixed to the third ring 20.

Figure 6:
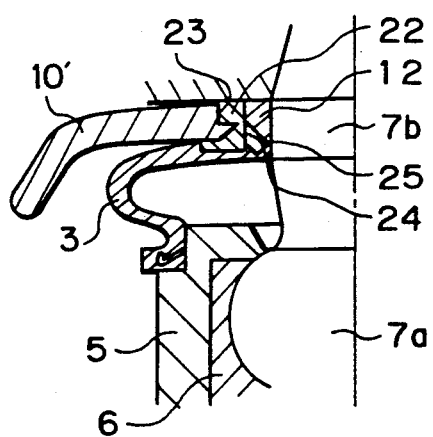

FIG. 6 shows a fourth embodiment of the mounting means 11. In this embodiment, the mounting means 11 comprises a fourth ring 22 attached to the lip portion 12 of the dust cover and a hole 23 in which the fourth ring is inserted. The hole 23 is disposed in the central portion of the body 10'. An inner edge of the hole 23 is provided with a projection 24 which is fitted in a groove 25 formed in the outer periphery of the fourth ring 22. In the embodiment, the body 10' is mounted on the fourth ring 22 by inserting the fourth ring into the hole 23 and the projection 24 is then press-fitted into the groove 25 so that the body 10' is secured to the dust cover.

Figure 7:
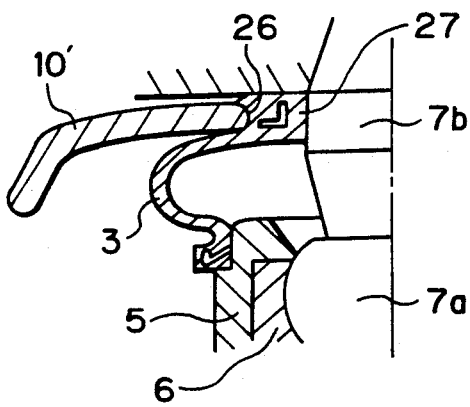

FIG. 7 shows a fifth embodiment of the mounting means 11. In the embodiment, the mounting means comprises a hole 26 provided in the central portion of the body 10' and a lip portion 27 provided on the dust cover. The lip portion 27 is inserted into the hole 26.

This embodiment differs from the above-mentioned embodiments in that the rings are not used and the lip portion is integrally formed on the dust cover.

In the above-mentioned embodiments, any binding agent may be used when the body of the protector is secured to the rings or the lip portion of the dust cover. Preferably, the body is spaced apart from the knuckle arm 4 as the body 10' is secured to the dust cover, as shown in FIG. 2. As a result, the body 10' has no surface contacting with the knuckle arm 4 and therefore there is no wear of the body. In this case, the end of the lip portion of the dust cover contacts with the knuckle arm to hold a seal between the dust cover and the knuckle arm.

The body may be provided with a plurality of radial slits 30 spaced apart on the outer periphery of the flange portion as shown in FIG. 3. The slits prevent deformation, or cracking of the body due to flying stones. The body preferably has a sufficient thickness and configuration to prevent it from being deformed by flying stones.

From the above description of the preferred embodiments of the present invention, those skilled in the art will perceive improvements, changes and modifications within the slope of the art which are intended to be covered by the appended claims.

What is claimed is:

1. A protector for a ball joint comprising:
   a body for protecting a dust cover mounted on said ball joint; and
   means for mounting securely said body on said dust cover,
   said body including a flat circular base portion, a hole provided in a central portion of said base portion, a curved flange portion integrally formed on the periphery of said base portion and a plurality of slits radially provided on the periphery of said flange portion.

2. A protector for a ball joint comprising:
   a body for protecting a dust cover mounted on said ball joint; and
   means for securely mounting said body on said dust cover, said mounting means comprising a hole provided in said body, a lip portion formed in said dust cover and a ring mounted on said lip portion for inserting into said hole.

3. An apparatus comprising:
   a ball joint;
   a dust cover mounted on said ball joint;
   a protector for protecting said dust cover; and
   means for mounting said protector on said dust cover, said mounting means including a ring mounted on a lip portion of said dust cover, said ring extending into an opening in said protector to hold said protector on said dust cover.

* * * * *